C. O. PERRINE.
DEVICE FOR PACKING EGGS.

No. 176,345.          Patented April 18, 1876.

WITNESSES:
L. L. Bond
O. W. Bond

INVENTOR:
Charles O. Perrine

UNITED STATES PATENT OFFICE.

CHARLES O. PERRINE, OF CHICAGO, ILLINOIS.

IMPROVEMENT IN DEVICES FOR PACKING EGGS.

Specification forming part of Letters Patent No. 176,345, dated April 18, 1876; application filed September 23, 1875.

*To all whom it may concern:*

Be it known that I, CHARLES O. PERRINE, of the city of Chicago, Cook county, State of Illinois, have invented a new and useful Improvement in Egg-Carriers, of which the following is a full description, reference being had to the accompanying drawings, in which—

Figure 1:
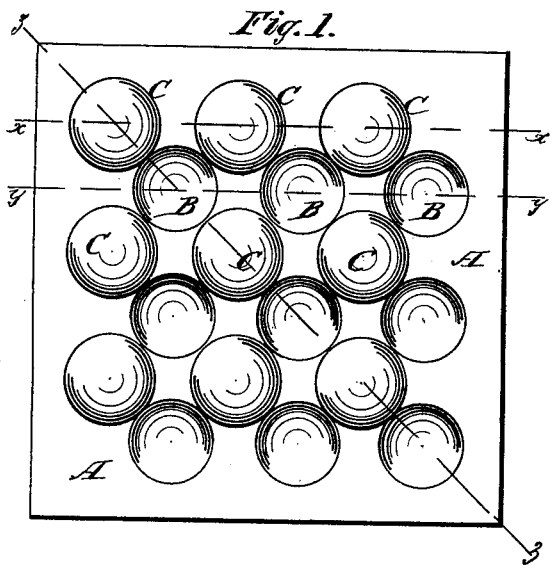
Figure 2:
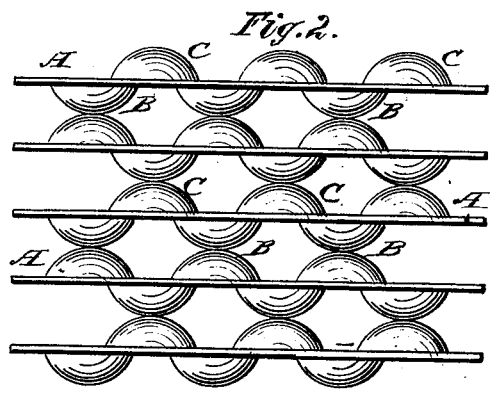
Figure 3:
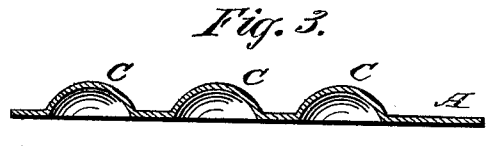
Figure 4:
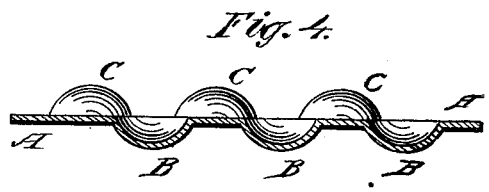
Figure 5:
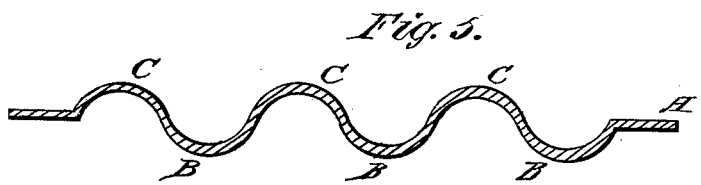

Figure 1 is a plan view of one of the division plates or holders; Fig. 2, a side view, showing five plates or holders in position; Fig. 3, a cross-section on line $x\ x$ of Fig. 1; Fig. 4, a cross-section on line $y\ y$ of Fig. 1; Fig. 5, a cross-section on line $z\ z$ of Fig. 1.

The object of this invention is to so construct division-plates for egg-carriers that they shall act both as holders and partitions for and between the several layers of eggs, and utilize the space within the box in which they are to be placed in the most economical manner; and its nature consists in forming plates with reverse cavities, as shown, so that in packing the end of the eggs of each layer will be brought near to the central or larger portion of each adjoining layer, and thereby utilize the space which is otherwise lost when square cells are made for each egg having a capacity equal to the largest part of the egg.

In the drawings, A represents the division-plate; B, the concave portion, and C the convex portion, of the same.

The plates A are made of paper-stock run into a properly-formed mold, and are usually made of a size to receive thirty-six eggs on each side, but the number may be varied to suit circumstances.

I prefer to make the plates A in this manner, for the reason that they are then uniform in strength and consistency, and do not get out of shape in curing or in use, but they may be made of ordinary straw-board, and the cells pressed out by cutting across them, as shown at Fig. 6, which produces points $a$, as shown. When made in this manner they are not quite as strong, and do not retain their shape as well as when made on a mold directly from the pulp.

These plates are arranged in a box, as shown at Fig. 2, by which arrangement about one-fourth of the egg at each end passes into the cavities B C, and the supporting-pressure comes upon the ends of the eggs, which is the strongest direction. By this arrangement when the eggs are placed in these cavities, the ends come together, or nearly together, in one tier opposite the middles of the eggs in the adjoining tier, so that all the space is utilized, and I am thereby enabled to get the same number of eggs into a smaller space than has heretofore been done, when each egg is provided with a separate cell or compartment.

In Fig. 2 the cavities or cells are shown in contact, and they may be made of sufficient depth to bring them into the position shown; but they can be used with safety and hold the eggs equally as secure by making them slightly shallower, so that when filled they will not come quite in contact.

By turning each alternate plate A half-way around they will fit into each other for close packing.

I do not limit myself to the material described nor to the process of manufacture, but to the form, as I am aware plates have been used having cavities upon one side; but in this form of plate the eggs cannot be packed so closely together, nor can the space in the box be utilzed as well as by my improved plates, nor can the plates be packed as closely in transportation as by improvement. I do not, therefore, claim plates having cavities upon one side only; but

What I claim as new, and desire to secure by Letters Patent, is as follows:

An egg-carrier formed of plates A, having concave portion B and convex portions C, arranged as described, whereby the ends of the eggs are brought nearly together, and the plates allowed to be packed closely for transportation, substantially as and for the purpose set forth.

CHARLES O. PERRINE.

Witnesses:
L. L. BOND,
O. W. BOND.